(12) United States Patent
Risser et al.

(10) Patent No.: US 11,926,470 B2
(45) Date of Patent: Mar. 12, 2024

(54) FEED BIN ANTI-BRIDGE DEVICE

(71) Applicant: Valco Industries, Inc., New Holland, PA (US)

(72) Inventors: Philip E. Risser, Leola, PA (US); Logan Auker, Ephrata, PA (US); Jake Byer, Coldwater, OH (US); Andrei Pavel, Lancaster, PA (US)

(73) Assignee: VALCO INDUSTRIES, INC., New Holland, PA (US)

(*) Notice: Subject to any disclaimer, the term of this patent is extended or adjusted under 35 U.S.C. 154(b) by 857 days.

(21) Appl. No.: 17/011,974

(22) Filed: Sep. 3, 2020

(65) Prior Publication Data
US 2021/0061549 A1    Mar. 4, 2021

Related U.S. Application Data

(60) Provisional application No. 62/895,146, filed on Sep. 3, 2019.

(51) Int. Cl.
*B65D 88/66* (2006.01)
*B65G 69/08* (2006.01)

(52) U.S. Cl.
CPC ............ *B65D 88/66* (2013.01); *B65G 69/08* (2013.01); *B65G 2201/042* (2013.01); *B65G 2814/0217* (2013.01)

(58) Field of Classification Search
CPC .... B65D 88/66; B65G 2201/04; B65G 69/08; B65G 2814/0217
See application file for complete search history.

(56) References Cited

U.S. PATENT DOCUMENTS

| | | | | |
|---|---|---|---|---|
| 3,854,612 A | * | 12/1974 | Snape | B65D 88/66 |
| | | | | 222/196 |
| 4,223,044 A | * | 9/1980 | Se | B65D 88/706 |
| | | | | 366/101 |
| 4,310,106 A | * | 1/1982 | Greck | B65D 88/66 |
| | | | | 414/415 |
| 4,363,428 A | * | 12/1982 | Kruger | B65D 88/68 |
| | | | | 222/227 |

(Continued)

FOREIGN PATENT DOCUMENTS

| | | | | |
|---|---|---|---|---|
| DE | 4439401 C2 | * | 3/1997 | ............ B65D 88/66 |
| JP | 2010-52784 | | 3/2010 | |
| WO | 92/19432 | | 11/1992 | |

OTHER PUBLICATIONS

Examination Report dated Jun. 29, 2023 in corresponding United Kingdom Patent Application No. GB2201742.0.

(Continued)

*Primary Examiner* — Abigail A Risic
(74) *Attorney, Agent, or Firm* — DUANE MORRIS LLP

(57) ABSTRACT

A lifting mechanism for operably attaching to one of the plurality of support legs on a bin is provided where the lifting mechanism is configured to sequentially lift and drop the support leg by a predetermined amount, whereby an impact shock generated by the drop is transmitted to the bin through the support leg and promote dislodging of any of the particulate material that may be in a non-flowable state to enhance dispensing of the particulate material from the bin. A bin assembly incorporating such lifting mechanism on at least one of its plurality of support legs is also disclosed.

15 Claims, 14 Drawing Sheets

(56) References Cited

U.S. PATENT DOCUMENTS

| | | | | |
|---|---|---|---|---|
| 4,363,589 A | * | 12/1982 | Rozwadowski | B65G 65/23 |
| | | | | 222/196 |
| 4,999,021 A | * | 3/1991 | Reissmann | B65D 88/66 |
| | | | | 222/196 |
| 9,714,122 B2 | * | 7/2017 | Snape | B65D 90/205 |
| 10,618,744 B2 | * | 4/2020 | Eiden, III | B65D 88/32 |
| 2021/0069757 A1 | * | 3/2021 | Procksch | G01M 7/025 |
| 2022/0373173 A1 | * | 11/2022 | Chlebovec | B65G 11/206 |

OTHER PUBLICATIONS

International Search Report and Written Opinion dated Nov. 19, 2020 in corresponding PCT Application No. PCT/US20/49279.

* cited by examiner

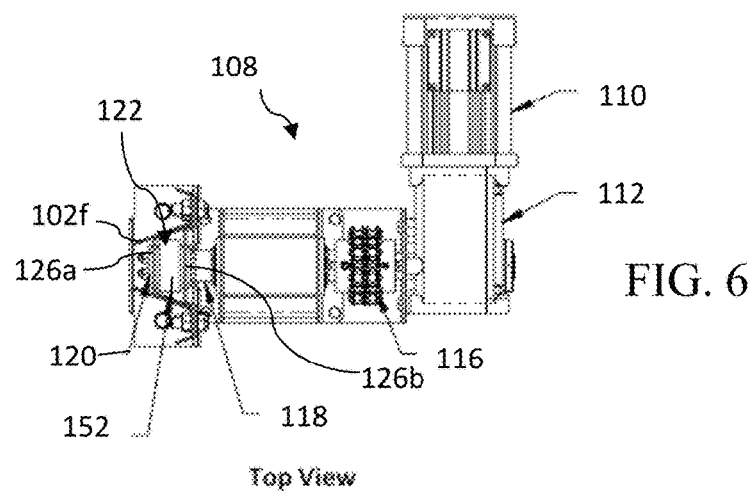
FIG. 6 Top View
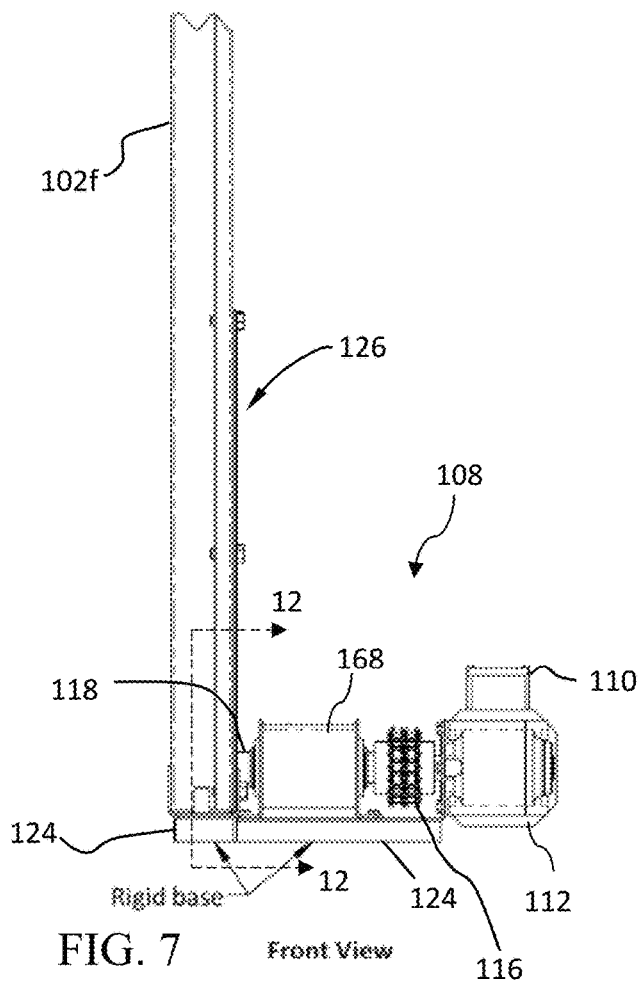
FIG. 7 Front View
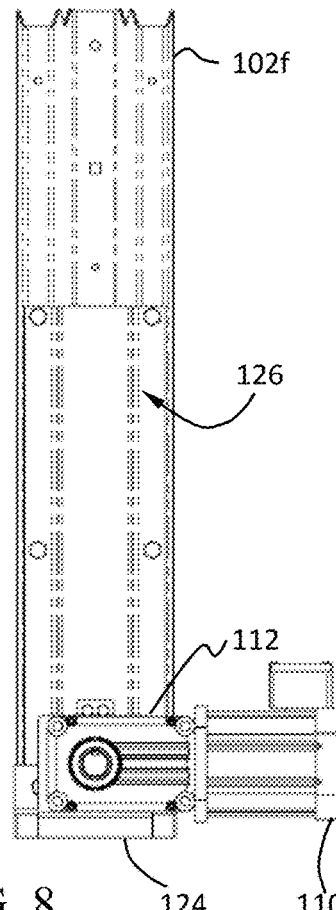
FIG. 8 Side View

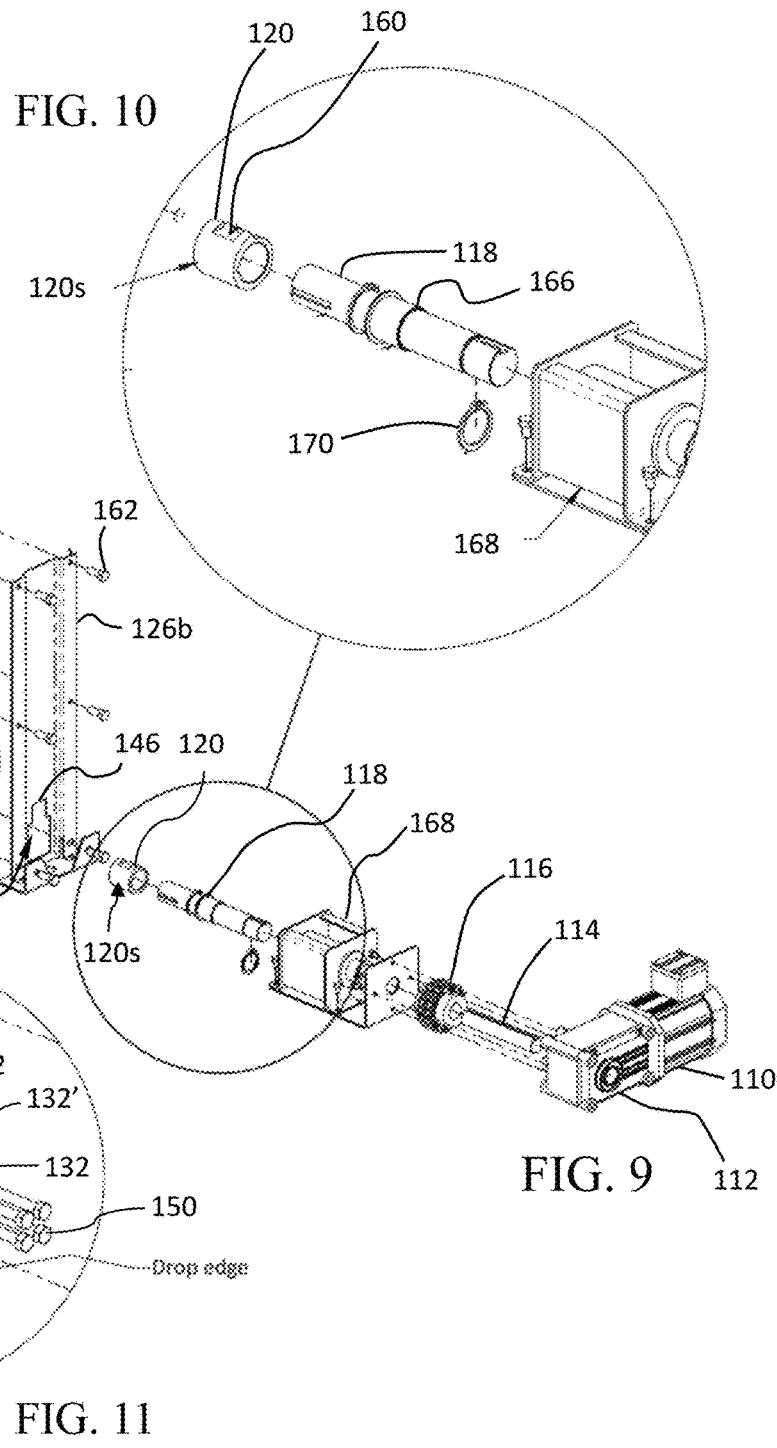

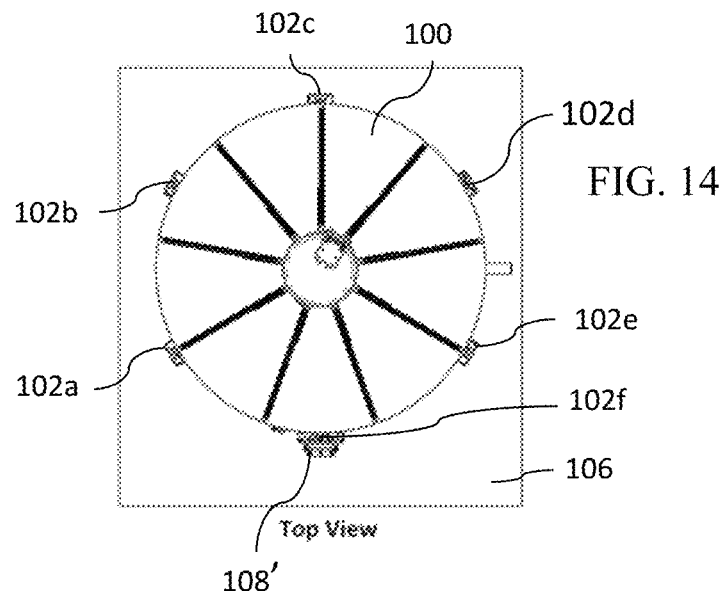
FIG. 14
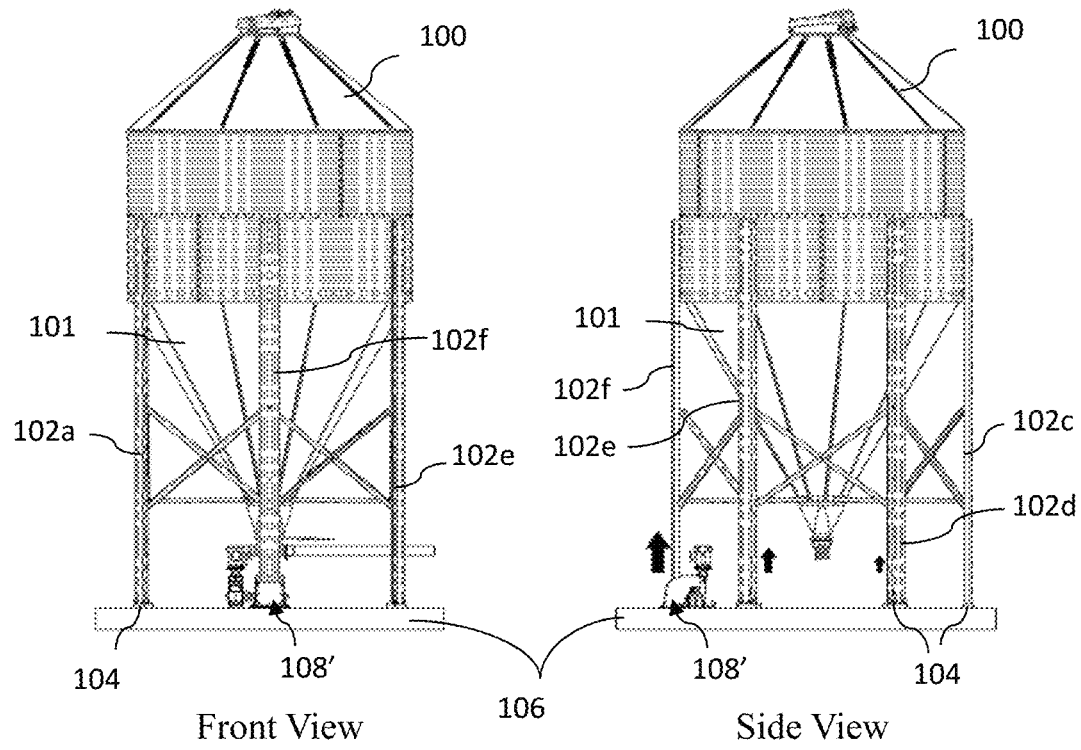
Front View
FIG. 15
Side View
FIG. 16

Section A-A

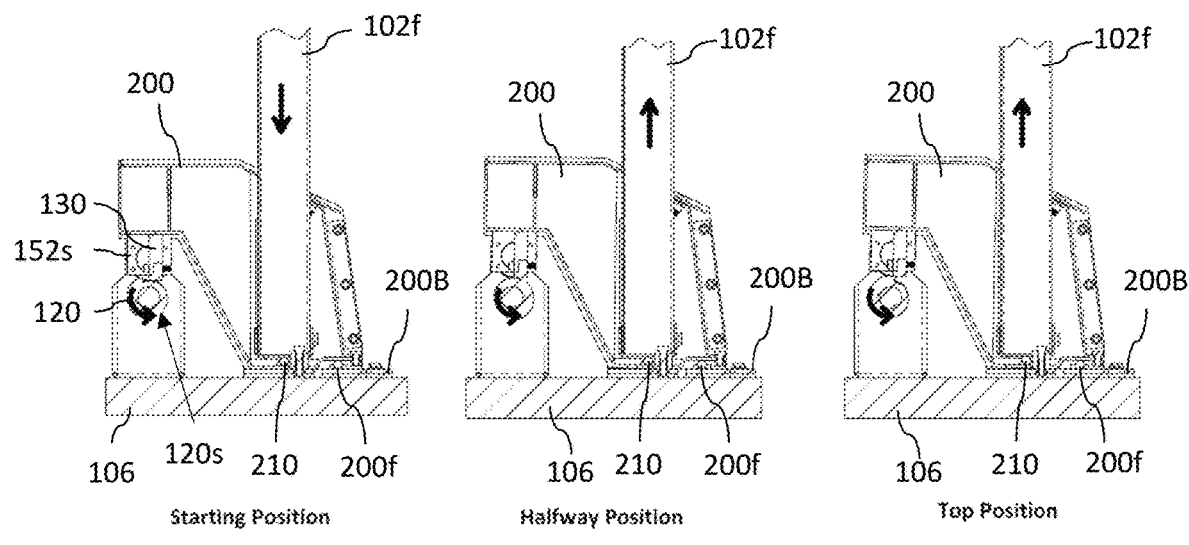
FIG. 21A (SECTION B-B)  FIG. 21B (SECTION B-B)  FIG. 21C (SECTION B-B)

Starting Position

Halfway Position

Top Position

FEED BIN ANTI-BRIDGE DEVICE

CROSS-REFERENCE TO RELATED APPLICATIONS

This application claims priority to U.S. Provisional Application No. 62/895,146, filed Sep. 3, 2019, the entirety of which is hereby incorporated herein by reference.

BACKGROUND

Animal feed is often stored in hopper storage tanks. The storage tanks, or feed bins, have a tapered bottom with one or more outlets at the bottom (unloader) where feed exits the feed bin and flows into the barn. Typically, the feed flows out of the unloader by mechanical means but flows into it by gravity. It is a common occurrence for the feed to bind or clump somewhere above the unloader and fail to flow freely. Because the feed often contains high moisture and fat content, in addition to other factors, the feed can bind or clump and form a bridge or an arch-like connection that extends across the interior space of the tapered funnel, "rat hole," or cling to the sidewall of the hopper or feed bin, as shown in FIG. 1. The entrapped feed may prevent the feed bin from emptying and delivering feed into the barn.

There are several known methods available to maintain free flow of feed from the storage tanks. These include pneumatic vibrators, mechanical vibrators, pneumatic "sweep" outlets, rotating flails, and funnel inserts. One method of ensuring that feed continues to flow from the storage tank is a high frequency vibrator mounted to the bottom of the hopper. The vibrator consists of an electric motor and a spinning eccentric weight. The vibrator is connected to horizontal and vertical bars inside the hopper. When the motor is activated, vibrations travel through the structure of the bin causing material to move and fall. These vibrators cause high frequency vibrations that can cause the fasteners of the bin and supporting structure to loosen and, potentially, fall out.

Another method is a low frequency vibrator mounted to the lower outlet of the hopper. These low-frequency vibrators include a spring-loaded hammer that is drawn back and released, thereby creating an impact on the hopper. The hammer is drawn back by a mechanical cam and is powered by an electric motor. The effectiveness of such vibrators is limited to the local area of impact and they are not able to prevent or address bridging in other areas of the hopper or bin.

Therefore, there is a need for improved ways to maintain free flowing discharge of feed from feed bin and hopper.

SUMMARY

Provided is a lifting mechanism operably attachable to a support leg of a bin for dispensing particulate material where the lifting mechanism operates to promote dislodging of any of the particulate material that may be in a non-flowable state to enhance dispensing of the particulate material from the bin. The lifting mechanism comprises a drive operatively attached to the lifting mechanism such that operation of the drive causes the lifting mechanism to sequentially lift said support leg by a predetermined amount then drop said support leg into a free fall, whereby an impact shock is transmitted to the bin through the support leg and promote dislodging of any of the particulate material that may be in a non-flowable state to enhance dispensing of the particulate material from the bin.

Also provided is a bin for dispensing particulate material comprising a plurality of support legs supporting the bin on a foundation, at least one lifting mechanism resting on the foundation and also operably attached to one of the plurality of support legs, and a drive operatively attached to the lifting mechanism such that operation of the drive causes the lifting mechanism to sequentially lift said support leg that is attached to the lifting mechanism by a predetermined amount then drop said support leg into a free fall. The dropping of the support leg generates an impact shock that is transmitted to the bin through the support leg and promote dislodging of any of the particulate material that may be in a non-flowable state to enhance dispensing of the particulate material from the bin.

BRIEF DESCRIPTION OF THE DRAWINGS

The features of the embodiments described herein will be more fully disclosed in the following detailed description, which is to be considered together with the accompanying drawings wherein like numbers refer to like parts and further wherein:

FIGS. 6-8 are top, front, and side views, respectively, of a lifting mechanism according to one embodiment described herein coupled to a leg of a bin.

FIG. 9 is an exploded view of the lifting mechanism of FIGS. 6-8.

FIG. 10 is a detail view of a stepped cam, cam driveshaft, and housing of the lifting mechanism of FIGS. 6-8.

FIG. 11 is a detail view of a cam follower assembly of the lifting mechanism of FIGS. 6-8.

FIGS. 14-16 are top, front, and side views, respectively, of the bin and hopper of FIG. 13.

FIGS. 21A-21C are cross-sectional views of the cam and cam follower roller assembly of the lifting mechanism of FIGS. 17-20 at three stages of operation. The cross-sections are taken through the section line B-B shown in FIG. 20.

DETAILED DESCRIPTION

Figure 1:
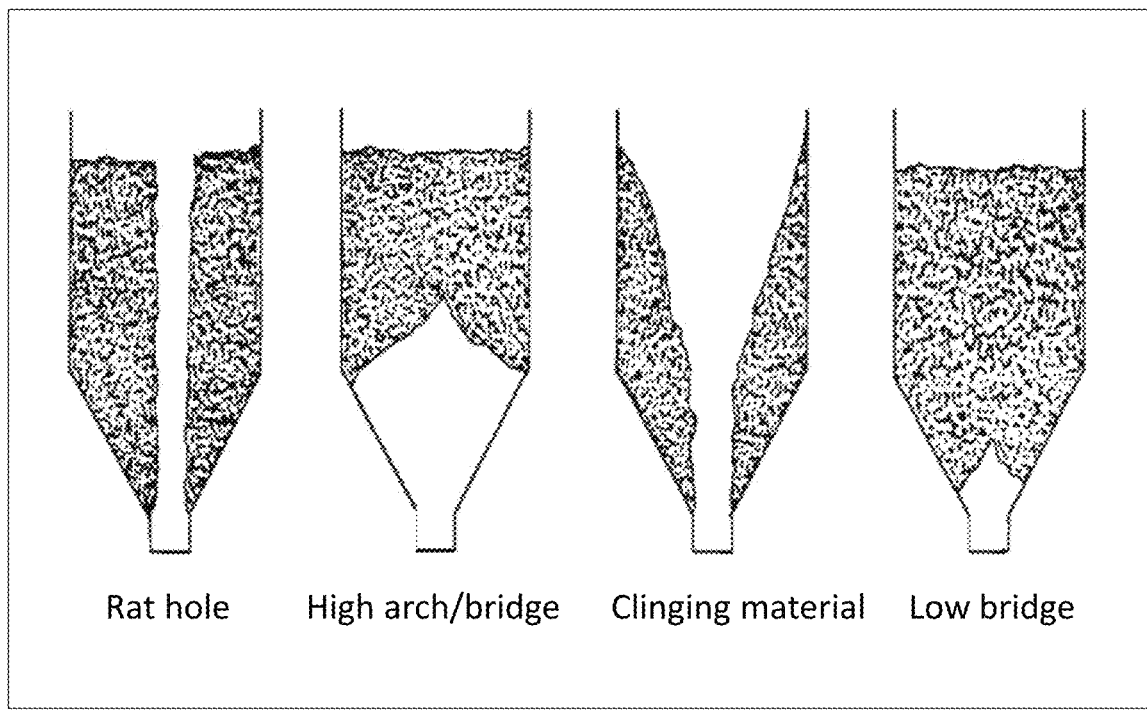
FIG. 1 illustrates exemplary forms of entrapped feed that occur in hoppers and feed bins.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
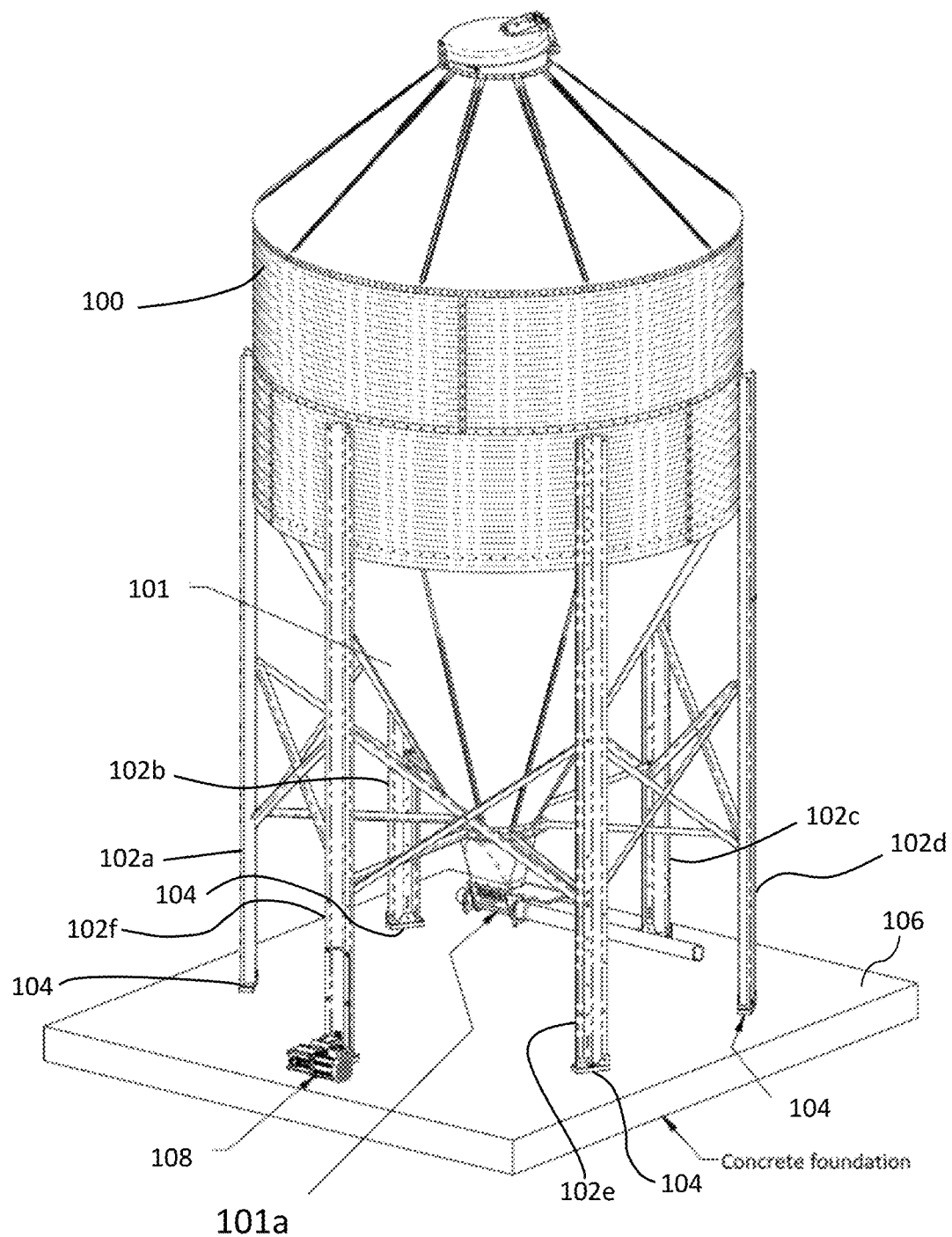
FIG. 2 is a perspective view of a bin and a hopper for holding particulate material with certain of the bin's support legs mounted to pads and certain other of the bin's support legs coupled to a lifting mechanism according to one embodiment described herein.
Figure 3:
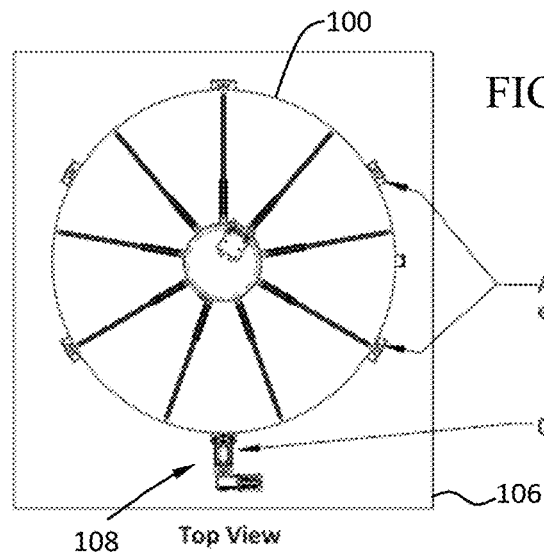
FIGS. 3-5 are top, front, and side views, respectively, of the bin and hopper of FIG. 2.
Figure 4:
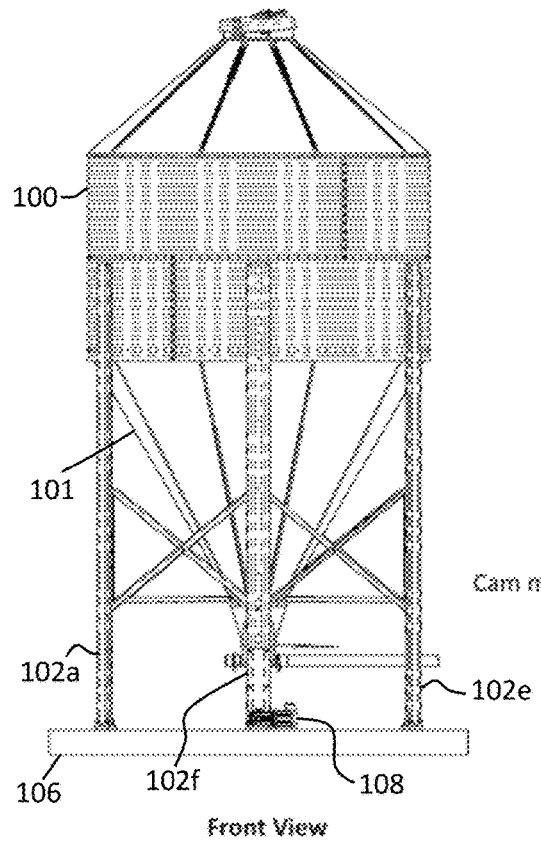
Figure 5:
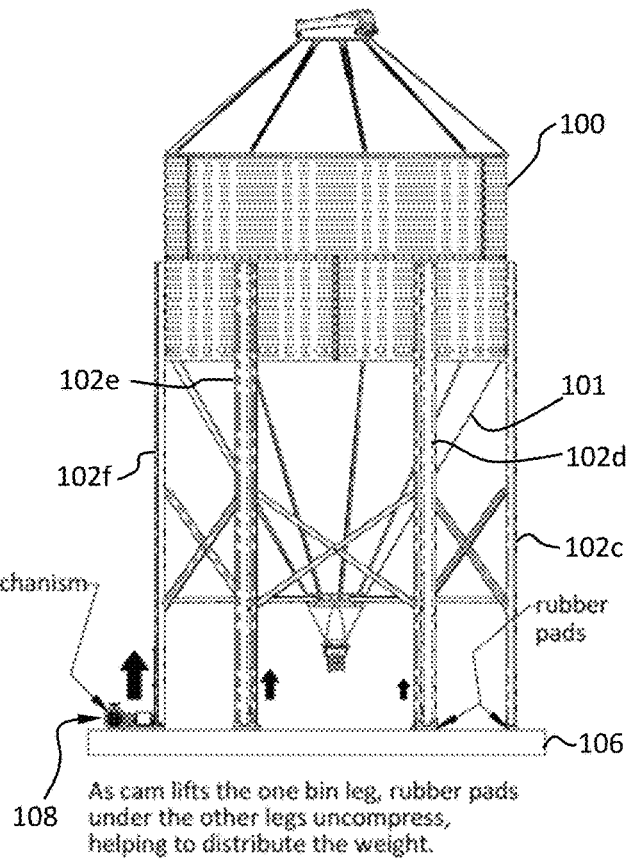

The inventive anti-bridge mechanisms described herein are configured to ensure that particulate material held in a bin with a hopper is able to continue to flow through the bin and hopper. Referring to FIG. 2, an embodiment of the inventive mechanism is a lifting mechanism 108 configured to lift at least one of the legs 102a-102f supporting the bin 100 and, subsequently, allow the leg to drop back downward and into contact with a supporting structure. In the illustrated example in FIG. 2, the lifting mechanism 108 is installed under the leg 102f. The resulting impact imparts a sudden force to the whole bin structure including a hopper 101. The sudden impact causes an impact shock wave to be propagate throughout the bin 100 structure and causes disturbances and vibrations in the bin 100 structure and shakes the particulate material inside the bin and acts to dislodge any particulate material stuck therein. Because one leg 102f is being lifted and dropped by the lifting mechanism 108, the other legs 102a-102e supporting the bin 100 and hopper may be mounted on elastic compressive support pads 104 rather than being set directly on a foundation 106. The elastic compressive support pads 104 impart a lifting force on the legs supporting the bin and hopper, thereby reducing the load on the lifting mechanism 108. The compressive support pads 104 can be made of an elastic material such as polyurethane elastomer having appropriate elastic modulus to handle the weight of the feed bin 100.

As shown in FIGS. 2-5, the bin 100 and hopper 101 are generally supported by multiple legs. In the illustrated example, the bin 100 and hopper 101 are supported by six legs 102a-102f However, it should be understood that the bin 100 and hopper 101 can be supported by any appropriate number of legs 102 depending on the dimension and weight of the bin 100 and the dimensions of each leg. The hopper 101 usually has a tapered funnel like structure and comprises an unloader 101a at the bottom where the particulate material exit the bin 100.

At least one of the legs (e.g., leg 102f) is coupled to a lifting mechanism 108. As shown in FIG. 2, in some embodiments, only a single leg is coupled to a lifting mechanism 108. In other embodiments, more than one leg 102 can be coupled to a lifting mechanism. In some embodiments, more than one leg can each be coupled to a lifting mechanism. The lifting mechanism 108 is configured to lift the leg 102f up from the resting position on the foundation 106, thus lifting that side of the bin 100 by a desired amount, then subsequently drop the leg 102f, and thus the bin 100 back down to the resting position on the foundation 106. The impact force generated by the dropping the bin 100 back to its resting position. The contact of the leg 102f with the foundation 106 results in an impact that causes particulate material entrapped in the bin 100 and/or the hopper 101 to be dislodged. The lifting mechanism 108 can be any device configured to lift the leg 102f a desired amount. For example, the lifting mechanism 108 can include a cam (as described below), a pneumatic and/or hydraulic jack, a drive screw coupled to a motor, or any other appropriate device that can lift the leg 102f from the foundation 106. The lifting and dropping of the bin 100 and hopper 101 can occur at any desired frequency. For example, in one embodiment, the impact occurs a few times per minute. The lifting mechanism 108 can be configured to completely release the leg 102f such that the leg 102f free falls until contacting foundation 106 or another supporting structure. Alternatively, lifting mechanism 108 can be configured to control the rate of descent of the leg 102f.

The lifting mechanism described herein can be used with any size bin. The impact energy of the drop is directly related to the amount of particulate material inside the bin and the height to which the leg is lifted and dropped from. The height to which the leg 102f is lifted can be selected such that the impact resulting from the leg 102f dropping is sufficient to break free particulate material that is stuck in the inside of the bin 100 and/or hopper 101. For example, in one embodiment, the leg 102f is lifted approximately 0.2 inches. In other embodiments, the leg 102f is lifted between about 0.1 inches and about 0.25 inches.

The legs that are not coupled to the lifting mechanism 108 (e.g., legs 102a-102e) are each mounted to a respective elastic compressive pad 104. The elastic compressive pads 104 are disposed between the respective leg 102 and the concrete foundation 106.

The elastic compressive pads 104 are sized and configured to deflect or compress when supporting a full or partially full bin 100. As the leg 102f is raised by the lifting mechanism 108, the elastic compressive pads 104 tend to return toward their uncompressed configuration and urge their respective legs upward. The elastic compressive pads 104 thereby act as springs to help support the lifting of the bin 100 and the hopper 101 by the lifting mechanism 108. The deflection of the pads 104 helps to evenly distribute the weight of the bin 100 as the leg 102f is raised.

One embodiment of a lifting mechanism 108 is shown in FIGS. 6-12C. As shown, for example, in FIGS. 6-8, lifting mechanism 108 includes a motor 110, a gearbox 112, an output shaft 114 (shown in FIG. 9), a flexible coupling 116, a cam driveshaft 118, a stepped cam 120, and a cam follower assembly 122 (shown in FIGS. 9 and 11). In various embodiments, one or more of the components of lifting mechanism 108 can be mounted to a base 124. The base 124 can be a single piece or multiple pieces, as shown in FIG. 7. As shown in FIG. 9, the lifting mechanism 108 also includes a leg supporting structure 126 that comprises two leg support pieces 126a, 126b. The leg supporting structure 126 is secured to one of the legs (in this example the leg 102f) supporting the feed bin 100.

The leg supporting structure 126 is configured to engage the lifting mechanism 108 so that the lifting mechanism 108 can lift the leg 102f. The two leg support pieces 126a, 126b are configured with apertures 142, 148, respectively. These apertures 142, 148 can be best seen in FIGS. 9 and 11. FIG. 9 is an exploded view of the lifting mechanism 108 including the two leg support pieces 126a, 126b. FIG. 11 is a detailed view of the cam follower assembly 122 portion of the exploded view in FIG. 9. The cam follower assembly 122 is coupled to the leg support pieces 126a, 126b via the two apertures 142, 148 and converts the rotational movement of the stepped cam 120 to an upward movement of the leg support pieces 126a, 126b and the leg 102f.

The cam follower assembly 122 comprises two cam followers 130, 132, and a cam follower roller 152 provided between the two cam followers 130, 132. The cam follower roller 152 rotates about a hub 154. In assembled configuration, the two cam followers 130, 132 each comprises a slot 130', 132', respectively, that engage their respective leg support pieces 126a, 126b. The cam follower 130 is positioned within the aperture 142 and the cam follower 132 is positioned within the aperture 148. The aperture 142 comprises a top edge 140 which engages the slot 130' on the cam follower 130. The aperture 148 comprises a top edge 146 which engages the slot 132' on the cam follower 132.

In assembled configuration, the cam followers 130, 132 are positioned above the stepped cam 120 and are in contact with the cam's cam surface 120s. As will be described in more detail below, the stepped cam 120 is configured to lift and drop the cam followers 130, 132 as the stepped cam 120 rotates.

As the cam followers 130, 132 are lifted up and dropped by the rotational motion of the stepped cam 120, because they are engaging the leg support pieces 126a, 126b by the apertures 142, 148, the cam followers 130, 132 in turn lift and drop their respective leg support pieces 126a, 126b and the leg 102f. The first 130 and second 132 followers may be coupled using fasteners 150. The apertures 142, 148 are further configured to allow passage of the cam 120 so that the cam 120 can engage the followers 130, 132.

In some alternate embodiments, the cam follower assembly 122 can have a single cam follower configured to mount directly to the leg 102f or indirectly via a leg support piece similar to the leg support piece 126a.

Figures 12A, 12B, 12C:
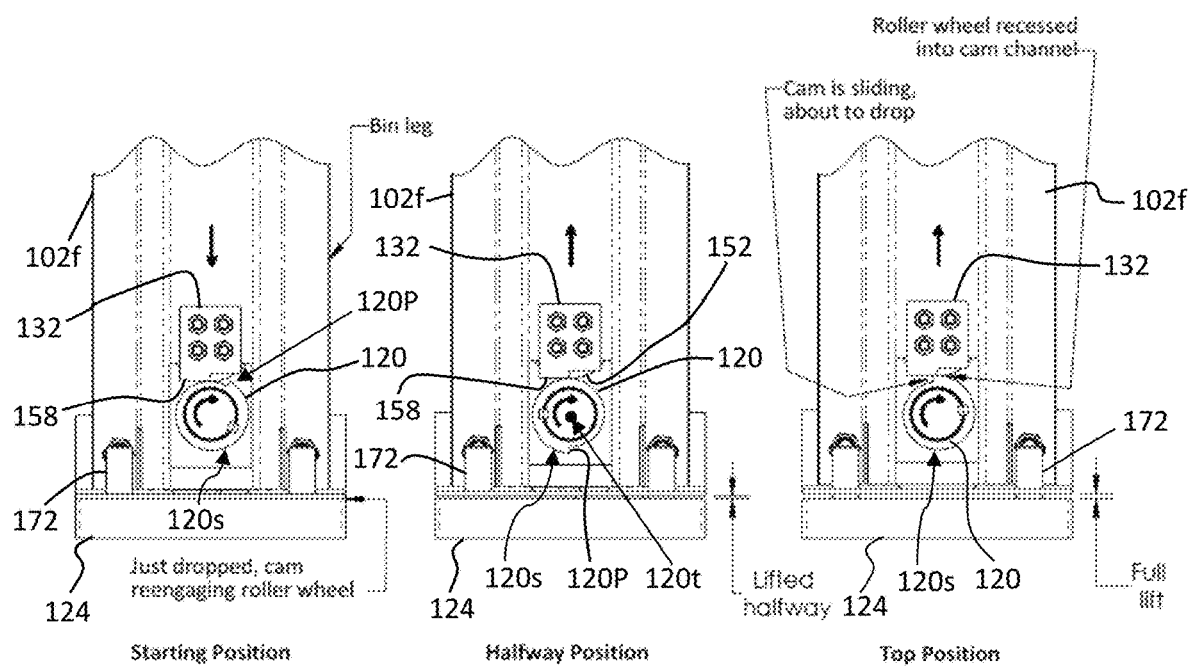
FIGS. 12A-12C are detail cross-sectional views of the cam and cam follower assembly of the lifting mechanism of FIGS. 6-8 at various stages of operation.
Figure 13:
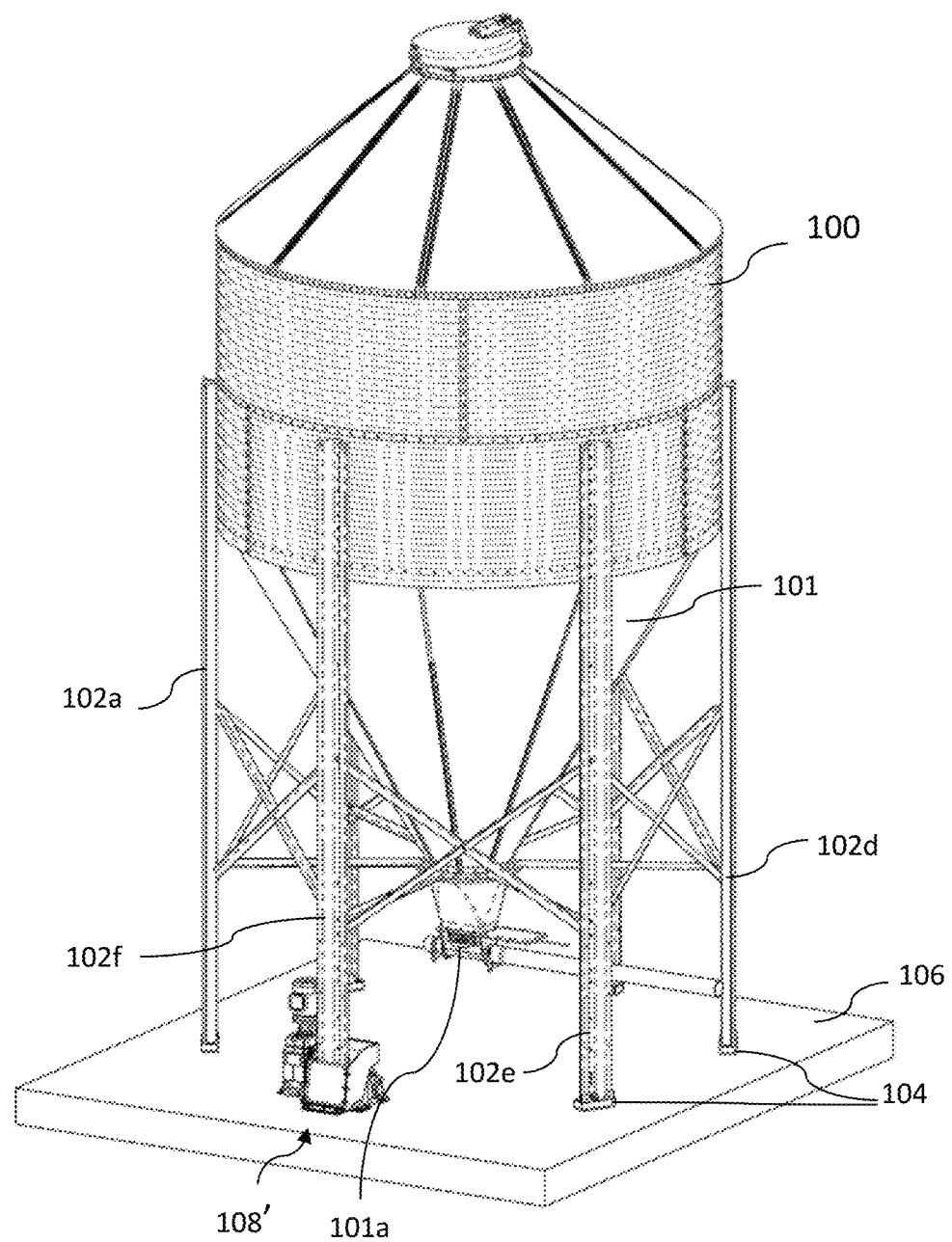
FIG. 13 is a perspective view of a bin and hopper with certain of the bin's support legs mounted to pads and certain other of the bin's support legs coupled to another embodiment of the lifting mechanism.

Referring to FIGS. 9, and 12A-12C, the stepped cam 120 has a cam surface 120s that has a continuously varying radius from the cam's center of rotation 120t. The cam surface 120s has a step 120P where the cam's radius abruptly transitions from its maximum to the minimum. As described above, the cam followers 130, 132 are in contact with the cam surface 120s. In the lifting mechanism 108 assembly, the stepped cam 120 is mounted such that the cam surface 120s gradually increases in radius from its center of rotation 120t as the stepped cam 120 rotates in the intended direction. In the illustrated example, the intended direction is clockwise direction as shown in FIGS. 12A-12C. FIGS. 12A-12C are views from one end of the lifting mechanism 108 assembly and thus only the cam follower 132 is visible. The cam follower 132 is positioned above the cam 120 and the cam follower's bottom surface 138 is in contact with the cam surface 120s.

FIGS. 12A-12C show the relative positions of the stepped cam 120 and the cam follower 132 in sequence during operation. In FIG. 12A, the stepped cam's follower 132 is at the "Starting Position" where the stepped cam's step 120P has just rotated past the contact point with the bottom surface 138 of the cam follower 132. The bottom surface 138 of the cam follower 132 has just dropped down from the highest point on the cam 120, the top of the step 120P to the lowest point on the cam 120. In the "Halfway Position" shown in FIG. 12B, the cam 120 has rotated halfway so that the step 120P is on the bottom position. The cam follower 132 is now halfway between the lowest position and the highest position. In the "Top Position" shown in FIG. 12C, the step 120P is on the top position directly under the cam follower 132. The cam follower 132 is in its highest position. As the stepped cam 120 continues to rotate, this cycle repeats and the cam follower 132 is pushed up and down by the stepped cam 120. The second cam follower 130 also goes through the same up and down motion. In turn, the cam followers 130, 132 move the leg 102f up and down, lifting the bin 100 up and down on one side where the leg 102f is located.

This drop of the leg 102f and the bin 100 generates the impact shock that dislodges any clumping and bridging of the particulate material inside the bin 100. In some embodiments, the height of the step 120P is configured such that when the leg 102f contacts foundation 106 or base 124 from the drop, the cam follower assembly 122 has not yet reengaged cam 120 (i.e., the height of the step 120P is greater than the lift height of leg 102l). As a result, the cam 120 is not subjected to impact loads from the dropping of the leg 102f. Instead, as shown in FIG. 12A, the cam 120 reengages the cam follower assembly 122 after the leg 102f is again supported by the foundation 106 or the base 124. In various embodiments, the cam 120 reengages the cam follower assembly 122 several degrees of rotation after the leg has dropped.

In some embodiments, the speed of the stepped cam 120's rotation can be adjusted to optimize the effectiveness of the system in keeping the flow of feed material through the hopper 101.

Referring back to FIG. 11, the cam follower roller 152 is disposed between the first follower 130 and the second follower 132 and is mounted to the hub 154 such that the cam follower roller 152 can rotate with respect to the hub 154. The hub 154 may be held in place by the fasteners 150 used to secure the first and second cam followers 130, 132. The cam follower roller 152 comprises a face 156 configured to contact the cam 120 for at least a portion of the cam 120's rotation. As shown best in FIGS. 12A-12C, when assembled, the face 156 of the cam follower roller 152 is lower than or approximately tangential to the bottom surface 138 of the cam followers 130, 132. As a result, throughout at least a portion of the rotation of the cam 120, the cam follower roller 152 is in contact with the cam surface 120s. This eliminates (or reduces) the load transferred through the first 130 and second 132 followers during that portion of the cam 120's rotation. The cam 120 and the cam follower roller 152 are in rolling contact, thereby eliminating (or reducing) the sliding friction that the cam 120 needs to overcome through that portion of the cam 120's rotation in which it is in contact with the roller 152. As the leg 102f approaches its maximum lifted height, the cam follower roller 152 travels into a channel 160 provided in the cam surface 120s (shown in FIG. 10). This position is shown in FIG. 12C. With the roller 152 in the channel 160, the cam followers 130, 132 engage the cam 120. For the remainder of the rotation of the cam 120, the cam followers 130, 132 ride along the cam surface 120s. By reducing frictional forces, the cam follower roller 152 decreases the power requirement of the lifting mechanism (e.g., the power requirements of motor 110). By engaging the cam followers 130, 132 before reaching the ledge, the lifting mechanism 108 still allows the leg to fall sharply off of the step 120P, causing a rapid fall and subsequent deceleration at the bottom of the fall.

Referring to FIGS. 13 through 21C, a lifting mechanism 108' according to another embodiment is provided. In the illustrated example in FIG. 13, a lifting mechanism 108' according to another embodiment is installed under the leg 102f of the bin 100. The purpose and function of the lifting mechanism 108' is the same as those of the lifting mechanism 108 discussed above. The lifting mechanism 108' is configured to repeatedly lift and drop the bin 100 by lifting and dropping one of the legs that support the bin 100.

As shown in FIGS. 13-16, the lifting mechanism 108' is operably attached to at least one of the support legs (e.g., leg 102f) of the bin 100 for dispensing particulate material. As with the lifting mechanism 108, in this example, the lifting mechanism 108' is configured to lift the leg 102f up from the resting position on the foundation 106, thus lifting that side of the bin 100 by a desired amount, then subsequently drop the leg 102f, and thus the bin 100 back down to the resting position on the foundation 106.

Figure 17:
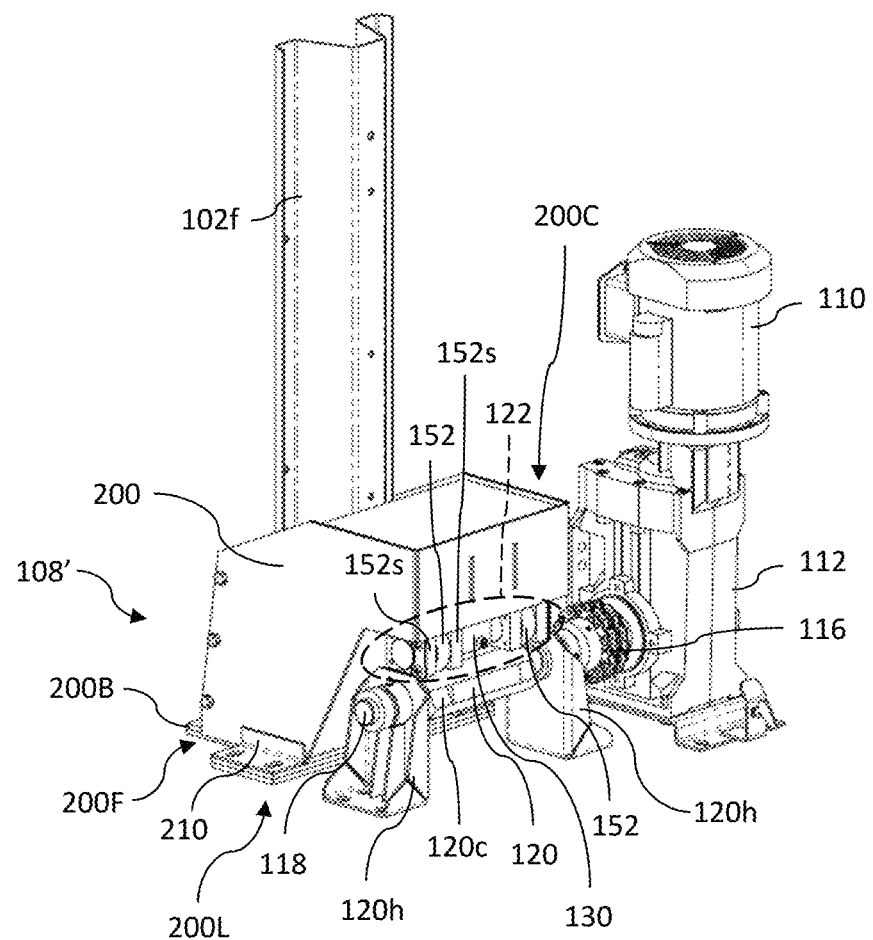
FIG. 17 is an isometric view of the lifting mechanism shown in FIG. 13.
Figure 18A:
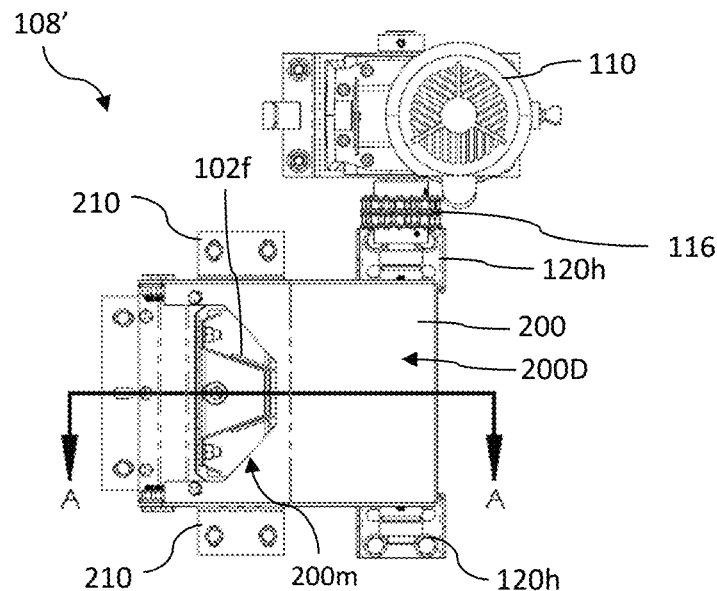
FIG. 18A is a top view of the lifting mechanism of FIG. 17.

Referring to FIGS. 17 and 18A, the lifting mechanism 108' includes a cam driving assembly that comprises a motor 110, a gearbox 112, a flexible coupling 116, a cam driveshaft 118, a stepped cam 120, and two cam follower assemblies. In various embodiments, one or more of the components of lifting mechanism 108' can be mounted to the concrete foundation 106. The stepped cam 120 comprises the cam drive shaft 118 that is supported by two cam supports 120h. The cam drive shaft 118 is operably connected to the drive motor 110 and the gear box 112 via the flexible coupling 116.

The lifting mechanism 108' includes a lever assembly 200 that transfers the lifting motion generated by the stepped cam 120 to the leg 102f. The lever assembly 200 comprises a cam follower assembly 122. In FIG. 17 the cam follower assembly 122 is identified by the dashed line oval 122 in FIG. 17. The cam follower assembly 122 comprises one or more cam follower 130 and one or more cam follower roller 152 that makes rolling contact with the cam surface 120s of the stepped cam 120 from above. In the illustrated example, the lifting mechanism 108' is configured with one cam follower 130 flanked by two cam follower rollers 152. The cam follower rollers 152 are next to the cam follower 130 but they do not necessarily have to be directly adjacent to the cam follower 130. They just need to be spatially positioned appropriately to engage the cam surface 120s. As in the lifting mechanism 108 embodiment, the cam follower 130 engages the step 120P portion of the stepped cam 120 for enabling the dropping of the leg 102f while the cam follower rollers 152 minimizes the frictional sliding contact between the cam follower assembly and the cam surface 120s during the operation of the stepped cam 120.

Figure 18B:
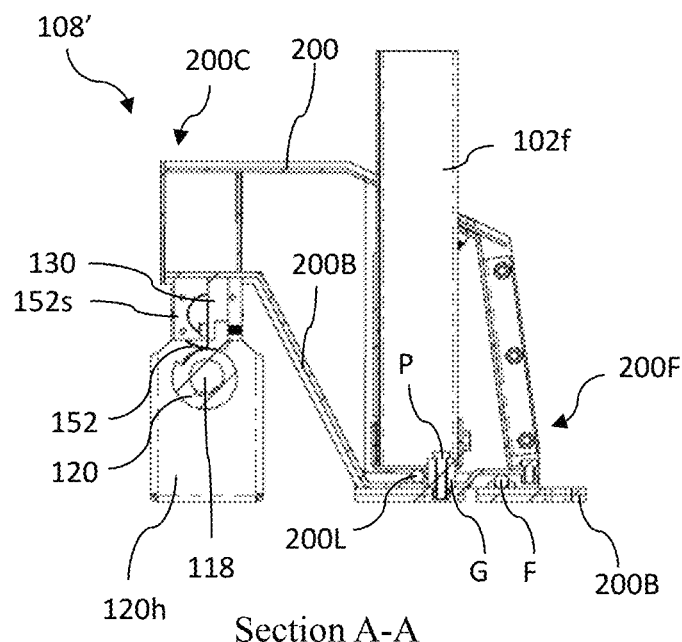
FIG. 18B is a section view of the lifting mechanism of FIG. 18A taken through section line A-A.
Figure 18C:
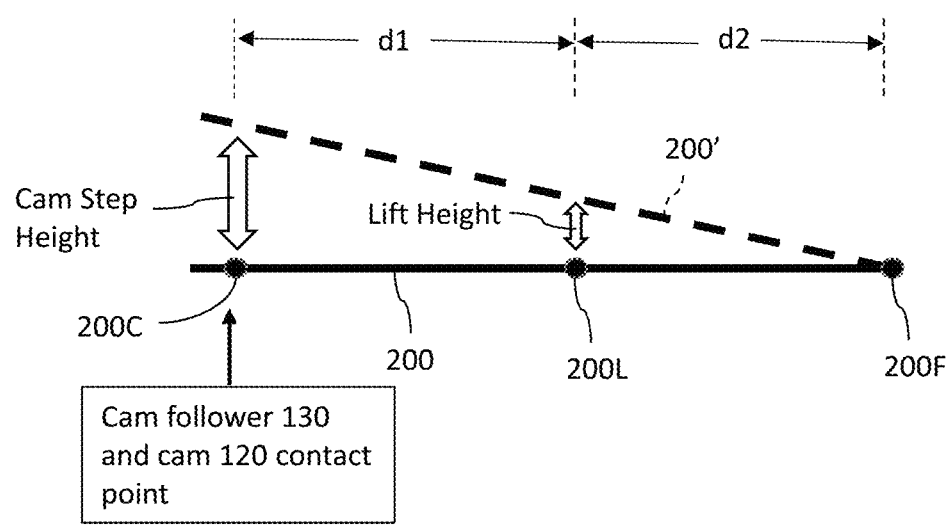
FIG. 18C is a schematic illustration of the workings of the lift mechanism 180' embodiment of FIG. 17.

Referring to FIGS. 17-18C, the lever assembly 200 is a lever that pivots about its fulcrum end 200F by the lifting and dropping motion enabled by the cooperation of the stepped cam 120 and the cam follower 130 located at the cam-engaging end 200C. Located between the fulcrum end 200F and the cam-engaging end 200C is a lifting point 200L that engages the leg 102f from below. The lifting point 200L is positioned below the leg 102f and bears the load of the leg 102f while lifting the leg 102f. The fulcrum end 200F is pivotally attached to a base 200B at a fulcrum F (see FIG. 18B) and as the cam-engaging end 200C of the lever assembly 200 is moved up and down by the cooperating action of the stepped cam 120 and the cam follower 130 which is attached to the cam-engaging end 200C. The lever assembly 200 is a rigid body and as the lever assembly 200 pivots up and down about the fulcrum F, the lifting point 200L also moves up and down and lifts the leg 102f up and down because the lifting point 200L is located between the cam-engaging end 200C and the fulcrum F.

As shown in FIG. 18A which is a top view of the lever assembly 200, the top surface 200D of the lever assembly 200 is provided with a cutout 200m to accommodate the support leg 102f extending down through the middle of the lever assembly 200 down to the lifting point 200L. The lever assembly 200 is preferably dimensioned to be wider than the width of the support leg 102f. This enables the lever assembly 200 to be sufficiently stable as it lifts the support leg 102f.

As can be seen in the Section A-A view in FIG. 18B, the support leg 102f is supported by the bottom piece 200B of the lever assembly 200. The bottom piece 200B extends from the cam-engaging end 200C to the fulcrum end 200F and passes under the support leg 102f. The bottom end of the support leg 102f is in contact with the bottom piece 200B by at least the lifting point 200L.

However, because the lifting point 200L is located between the cam-engaging end 200C and the fulcrum F, the distance "Lift Height" that is achieved at the lifting point 200L is smaller than the distance "Cam Step Height" moved at the cam-engaging end 200C. However, this lever arrangement allows the benefit of leverage provided by the lever assembly 200 and amplifies the lifting force applied by the stepped cam 120 at the cam-engaging end 200C and generates a greater lifting force at the lifting point 200L. Thus, the lever assembly 200 configuration reduces the amount of load carried by the cam 120 and its associated driving components for a given weight of the feed bin 100.

As described above, the cam follower 130 is operably connected to the support let 102f by the lever assembly 200. The lever assembly 200 extends between the fulcrum end 200F and the cam-engaging end 200C. The cam-engaging end 200C is attached to the cam follower 130 providing the operable connection between the cam follower 130 and the support leg 102f.

FIG. 18C illustrates this lever arrangement. The leverage provided by the lever assembly 200 is determined by the ratio of the first distance d1 between the cam-engaging end 200C and the lifting point 200L and the second distance d2 between the lifting point 200L and the fulcrum F. The position of the lever assembly 200 in the lifted position is schematically illustrated by the dashed line 200'.

Figure 19:
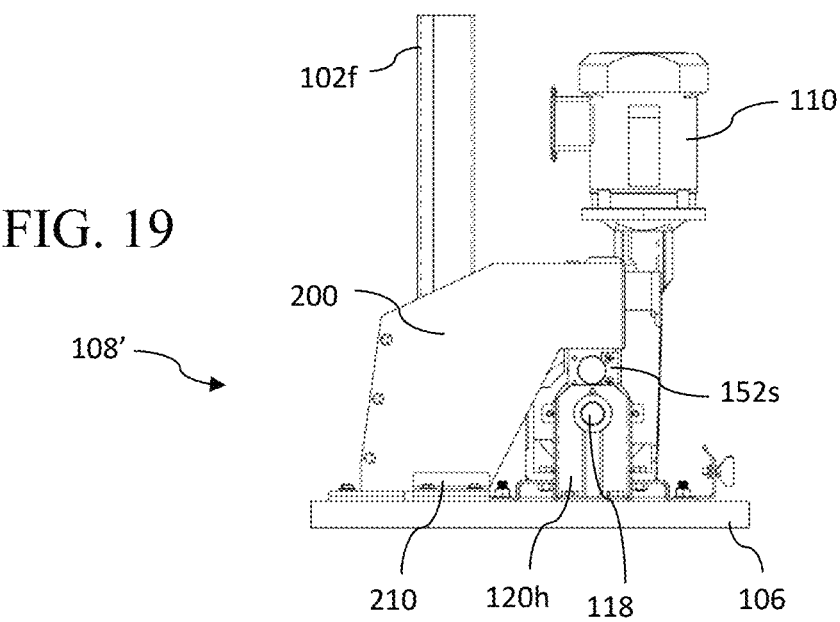
FIG. 19 is a front view of the lifting mechanism of FIG. 18A.

FIG. 19 is a side view of the lifting mechanism 108' that is installed on the concrete foundation 106 below the leg 102f.

Figure 20:
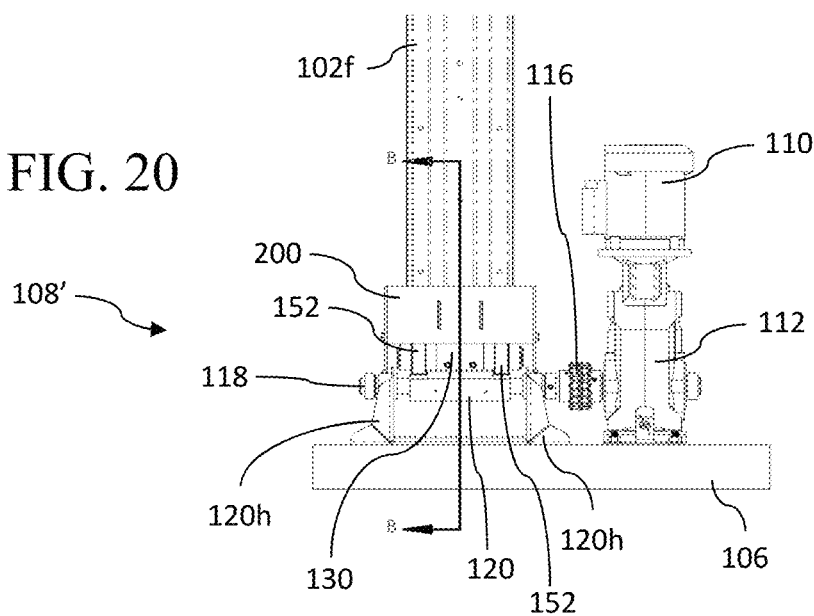
FIG. 20 is a side view of the lifting mechanism of FIG. 18A in which the cam has lifted the cam followers to their highest point.

FIG. 20 is a front view (i.e. from the right side of FIG. 19) of the lifting mechanism 108'.

Referring back to FIG. 17, the cam follower assembly 122 is attached to the bottom side of cam-engaging end 200C of the lever assembly 200 that hangs over the stepped cam 120. The cam follower assembly 122 is situated between the stepped cam 120 and the lever assembly 200 and as the stepped cam 120 rotates, the cam follower rollers 152 engage and ride on the cam surface 120s for majority of the duration of the cam 120's rotation. The structure of the stepped cam 120 in this embodiment is similar to the stepped cam 120 in the previously described embodiment of the lifting mechanism 108. As shown in the detailed views in FIGS. 22A-22C, the cam surface 120s has a continuously varying radius as measured from the center of rotation 120t of the stepped cam 120. The stepped cam 120 comprises a step 120P where the continuously varying radius of the cam surface 120s abruptly transitions from the smallest radius to the largest radius.

As shown in FIGS. 17, 20, 21A-22C, the cam follower assembly 122 comprises a cam follower 130 and two cam follower rollers 152 on either side of the cam follower 130. The cam follower 130 is positioned above the stepped cam 120 and is in contact with the cam surface 120s. As will be described in more detail below, the stepped cam 120 is configured to lift and drop the cam follower 130 as the stepped cam 120 rotates. As the rotation of the cam 120 (in counter clockwise direction shown in FIGS. 21A-22C) brings the step 120P closer to the top of the cam 120, the increasing radius of the cam surface 120s pushes the cam follower 130 away from the center of rotation 120t until the step 120P reaches the cam follower. Then, as the step 120P passes the cam follower 130, the cam follower 130 drops. In other words, the cam surface 120s lifts the cam follower 130 up then drops them as the cam follower 130 passes over the step 120P. This cooperating engagement between the stepped cam 120 and the cam followers 130 is similar to that of the corresponding structures in the first embodiment of the lifting mechanism 108 described above.

The cam surface 120s has a continuously changing radius as measured from the cam's center of rotation 120t. The cam surface 120s has a step 120P where the cam's radius abruptly transitions from its maximum to the minimum. As described above the cam follower 130 is in contact with the cam surface 120s. The stepped cam 120 is mounted such that the cam surface 120s gradually and continuously increases in radius as the stepped cam 120 rotates in the intended direction. In the illustrated example in FIGS. 21A-22C, the intended direction for the step cam 120 shown is counter-clockwise direction as indicated by the arrow A. If the cam 120 is configured with a cam surface 120s that is increasing in its radius in the opposite direction, the intended direction would then be clockwise direction.

Figure 22A:
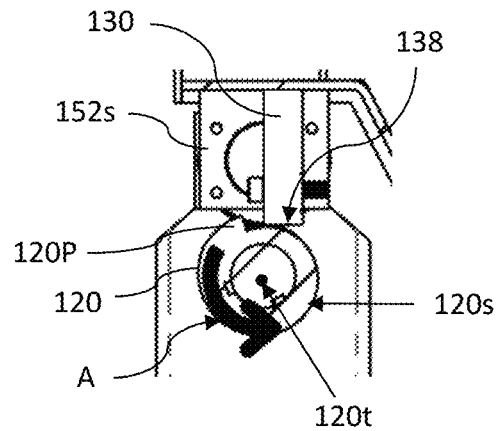
FIGS. 22A-22C are detailed view of the cam and cam follower roller assembly corresponding to the views of FIGS. 21A-21C, respectively.
Figure 22B:
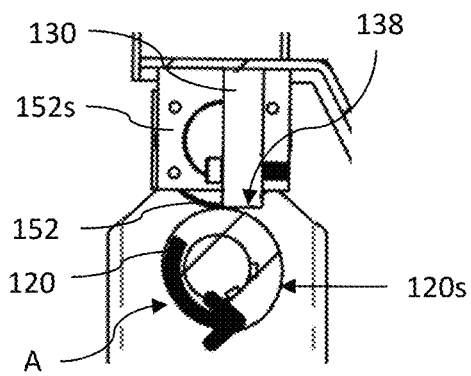
Figure 22C:
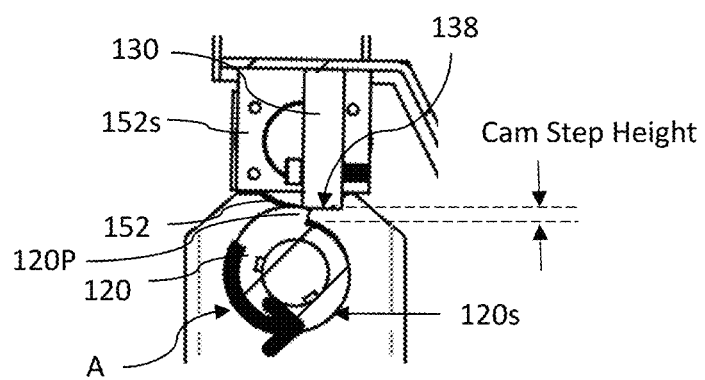

FIGS. 22A-22C show the relative positions of the stepped cam 120 and the cam follower 130 in sequence during operation. In FIG. 22A, the stepped cam's follower 130 is at the "Starting Position" where the stepped cam's step 120P has just rotated past the contact point with the bottom surface 138 of the cam follower 132. The bottom surface 138 of the cam follower 132 has just dropped down from the highest point on the cam 120, the top of the step 120P to the lowest point on the cam 120. In the "Halfway Position" shown in FIG. 22B, the cam 120 has rotated halfway so that the step 120P is on the bottom position. The cam follower 130 is now halfway between the lowest position and the highest position. In the "Top Position" shown in FIG. 22C, the step 120P is on the top position directly under the cam follower 132. The cam follower 130 is in its highest position. As the stepped cam 120 continues to rotate, this cycle repeats and the cam follower 130 is pushed up and dropped down by the stepped cam 120. In turn, the cam follower 130 moves the cam-engaging end 200C of the lever assembly 200 up and down. This, in turn, allows the lifting point 200L of the lever assembly 200 to lift the leg 102f up then drop down, thus lifting the bin 100 up then drop down on one side where the leg 102f is located. As explained above with the embodiment of the lifting mechanism 108, this generates the impact shock that dislodges any clumping and bridging of the particulate material inside the bin 100.

As with the lifting mechanism 108, in some embodiments of the lifting mechanism 108', the height of the step 120P is configured such that when the leg 102f contacts foundation 106 or base 200B from the drop, the cam follower 130 has not yet reengaged the stepped cam 120 (i.e., the height of the step 120P is greater than the lift height of leg 102f). As a result, the cam 120 is not subjected to impact loads from the dropping of the leg 102f. Instead, the cam 120 will reengage the cam followers 130 after the leg 102f is again supported by the foundation 106 or the base 124. In various embodiments, the cam 120 reengages the cam followers 130 several degrees of rotation after the leg 120f has dropped.

Referring to FIGS. 17, 20, and 22A-22C, the two cam follower rollers 152 are disposed next to the cam follower 130 and rides on the cam surface 120s. The cam follower rollers 152 and the cam follower 130 are arranged so that the lowest point of the cam follower rollers 152 is slightly lower (i.e. closer to the cam surface 120s) than the bottom surface 138 of the cam follower 130. This arrangement allows the bottom surface 138 of the cam follower 130 to follow just above the cam surface 120s while the cam follower rollers 152 are contacting and riding on the cam surface 120s through much of the rotation of the cam 120.

Along the tracks that the cam follower rollers 152 ride on the cam surface 120s, a channel 120c is cut into the cam surface 120s and through the step 120P for each of the cam follower roller 152. The channels 120c begin just a few rotational degrees (about 5-15 degrees) before the step 120P and ends at the step 120P so that where the smallest radius point of the cam surface 120s begins at the bottom of the step 120P, the floor of the channel 120c is at the same level as the cam surface 120s. As the cam 120 rotates and the cam follower rollers 152 enter the channel 120c portion, the floor of the channel 120c drops away from the cam follower rollers 152 and the bottom surface 138 of the cam follower 130 comes in direct contact with the cam surface 120s and the cam follower 130 becomes the load-bearing structure between the lever assembly 200 and the cam 120. The load born by the cam follower 130 is the attenuated load of the leg 102f applied to the lever assembly 200 at the lifting point 200L. The load born by the cam follower 130 is attenuated and not the full load of the leg 102f because of the leverage provided by the lever assembly 200.

Referring to FIGS. 21C and 22C, as the cam 120 continues to rotate the few more degrees in the direction of the arrow A, the bottom surface 138 of the cam follower 130 slides along the cam surface 120s until the step 120P is reached. Referring to FIGS. 21A and 22A, once the cam follower 130 passes the step 120P, the cam follower 130 drops down toward the lowest point of the cam surface 120s. However, at the same time, the cam follower roller 152, which has been moving through the channel 120c flies over the floor of the channel 120c, will now come in contact with the lowest point of the cam surface 120s before the bottom surface 138 of the cam follower 130 can contact the lowest point of the cam surface 120s. This is because, as mentioned above, the lowest point of the cam follower rollers 152 are lower than the bottom surface 138 of the cam follower 130. So, for the remainder of the next rotation cycle of the cam 120, the cam follower rollers 152 ride on the cam surface 120s while the cam follower 130 flies over the cam surface 120s without contacting until the channels 120c reach the cam follower rollers 152 again. This configuration utilizing the cam follower rollers 152 reduces the frictional forces encountered during each rotation of the cam 120. By reducing the frictional forces encountered, the power requirement for the driving mechanism for the cam 120 is also reduced.

According to the description provided herein, in both embodiments of the lifting mechanism 108 and 108', the motor 110 as the driving mechanism is operatively attached to the lifting mechanism such that operation of the drive causes the lifting mechanism 108, 108' to sequentially lift the support leg 102f by a predetermined amount then drop the support leg 102f into a free fall, whereby an impact shock is transmitted to the bin 100 through the support leg 102f and promote dislodging of any of the particulate feed material that may be in a non-flowable state inside the bin 100 to enhance dispensing of the particulate feed material from the bin.

As for the driving mechanism for the stepped cam 120, the motor 110 can be any appropriate type of motor. For example, in one embodiment, the motor 110 is an electric motor, such as a DC motor or an AC motor. In some embodiments, the motor 110 is axially aligned with the cam driveshaft 118. In other embodiments, as shown in FIGS. 6 and 17, the motor 110 is arranged transverse to the cam driveshaft 118. In such embodiments, the gearbox 112 can include a bevel gear (e.g., a straight bevel gear, a spiral bevel gear, or a Zero bevel gear) to accommodate the change in the axis of rotation. The gearbox 112 can have any appropriate gear ratio. For example, in one embodiment, the gearbox 112 has a gear ratio of 600:1 (i.e., 600 rotations of the driveshaft of the motor 110 for every one rotation of the cam 120). In other embodiments, the gearbox 112 has a gear ratio of between 300:1 and 1200:1.

The flexible coupling 116 may be configured to accommodate angular misalignment between the cam driveshaft 118 and the output shaft 114 of the gearbox 112. This may be used to accommodate deflection of the cam driveshaft 118 caused by the weight of the bin 100 during operation. The flexible coupling 116 may be any appropriate type of coupling such as, for example, a bellows coupling, a helical coupling, roller chain or a slit type coupling.

For the embodiment of lifting mechanism 108, the leg supports 126a, 126b may be constructed of any appropriate material. For example, the leg supports 126a, 126b may be constructed from steel, stainless steel, or aluminum. The leg supports 126a, 126b can be connected to the leg 102f in any appropriate manner. For example, as shown in FIG. 9, the leg supports 126a, 126b may be connected to the leg 102f using fasteners 162. The fasteners may be, for example, bolts and be secured in place with nuts 164.

As shown in FIG. 10, the cam 120 couples to the cam driveshaft 118. In one embodiment, the cam 120 and the cam driveshaft 118 are coupled via a keyed engagement. In addition, a bushing 166 is disposed on the cam driveshaft 118 to facilitate rotation of the cam driveshaft 118 with respect to a housing 168. Further, a retaining ring 170 secures the cam driveshaft 118 in place within the housing 168.

As shown in FIG. 9, in some embodiments, the base 124 includes posts 172 configured to engage holes (not shown) in leg 102f The posts 172 are of a sufficient length such that the leg 102f remains engaged with the posts 172 throughout the lifting process. This ensures that the motion of the leg 102f is approximately vertical and prevents the leg from "walking" during operation.

In other aspects, a method of dislodging entrapped particulate material from a bin or hopper is provided. The method includes lifting at least one leg supporting the bin off of a supporting structure. The method further includes bringing the at least one leg of the bin drop back down into contact with the supporting structure such that the contact of the at least one leg with the supporting structure such as a foundation causes particulate material that is entrapped within the bin or hopper to become dislodged. In some embodiments, the method includes rotating a cam to interact with a cam follower engaged with a leg of the bin.

In one aspect, a bin system includes a feed bin, a hopper, a plurality of legs supporting the bin and the hopper, and a lifting mechanism coupled to a leg of the plurality of legs. The lifting mechanism is configured to raise the leg from an underlying support structure and subsequently release the leg such that it impacts the underlying support structure.

In some embodiments, the lifting mechanism includes a cam and a cam follower assembly engaged with the leg. Rotation of the cam causes the cam follower assembly to lift the leg from the underlying support structure. The cam includes a ledge configured to allow the leg to abruptly drop into contact with the underlying support structure.

In some embodiments, the ledge has a height that is greater than a maximum lift height of the leg.

In some embodiments, the cam follower assembly includes a first follower, a second follower, and a roller. In such embodiments, the cam includes a channel such that the roller disengages from the cam prior to the leg reaching a maximum height. In some embodiments, the first follower is coupled to a first leg support and the second follower is coupled to a second leg support and each of the first and second leg supports is coupled to the leg.

In some embodiments, the bin system further includes a pad mounted to each of the plurality of legs that is not coupled to the lifting device. The pads are constructed at least partially of an elastomeric material.

In some embodiments, the supporting structure includes at least one post engaged with holes in the leg that is coupled to the lifting device. The at least one post is configured to maintain engagement with the leg as the leg is lifted to restrict horizontal motion of the leg. In some embodiments, the base includes two posts.

In some embodiments, the lifting mechanism includes a motor, a gearbox, an output shaft, and a cam driveshaft. The gearbox is configured to translate rotation of a driveshaft of the motor to rotation of the output shaft. The output shaft is coupled to the cam driveshaft and the cam driveshaft is coupled to the cam. In some embodiments, the output shaft is coupled to the cam driveshaft by a flexible coupling.

It will be understood that the foregoing description is of exemplary embodiments of this invention, and that the invention is not limited to the specific forms shown. Modifications may be made in the design and arrangement of the elements without departing from the scope of the invention.

We claim:

1. A bin for dispensing particulate material comprising:
   a plurality of support legs supporting the bin on a foundation;
   at least one lifting mechanism resting on the foundation and also operably attached to one of the plurality of support legs;
   a drive operatively attached to the lifting mechanism such that operation of the drive causes the lifting mechanism to sequentially lift the bin using said support leg that is attached to the lifting mechanism by a predetermined amount then drop said support leg into a free fall and impact the foundation, whereby an impact shock thus produced is transmitted to the bin through the support leg and promote dislodging of any of the particulate material that may be in a non-flowable state to enhance dispensing of the particulate material from the bin.

2. The bin of claim 1, wherein the operation of the drive causes the lifting mechanism to repeat the sequence of lifting and dropping said support leg.

3. The bin of claim 1, wherein the at least one lifting mechanism comprises at least one rotationally driven stepped cam and the drive comprises a motor for rotating the stepped cam; wherein:
- the cam includes a cam surface, and a cam follower assembly that comprises two cam followers and a cam follower roller provided between the two cam followers, wherein the cam followers support the one of the plurality of support legs and are positioned above the stepped cam and in contact with the cam surface;
- the cam follower roller is lower than or approximately tangential to the bottom surface of the cam followers, whereby the cam follower is in contact with the cam surface throughout at least a portion of the rotation of the stepped cam; and
- the cam and the cam follower rollers are in rolling contact, thereby reducing the sliding friction between the cam surface and the cam follower when the stepped cam is rotating.

4. The bin of claim 1, wherein the drive rotates the stepped cam and the stepped cam comprises:
- a center of rotation; and
- a cam surface that has a continually changing radius as measured from the rotational center, wherein the lifting mechanism further comprises a cam follower assembly that includes a cam follower that is operably connected to said support leg and engages the cam surface only during a portion of one rotation of the stepped cam to perform the sequential lifting and dropping of said support leg.

5. The bin of claim 4, wherein the stepped cam comprises a step in the cam surface where the radius of the cam surface transitions between its maximum radius to its minimum radius and the drive rotates the stepped cam in a direction such that once the cam follower engages the cam surface the radius of the cam surface continually increases thereby pushing the cam follower away from the center of rotation of the cam until said step reaches the cam follower.

6. The bin of claim 5, wherein the cam follower engages the cam surface within 5 to 15 degrees of rotation of the stepped cam before said step reaches the cam follower.

7. The bin of claim 5, wherein the cam follower is operably connected to said support leg by a lever assembly; wherein the lever assembly extends between a fulcrum end that is attached to the foundation and a cam-engaging end that is attached to the cam follower providing the operable connection between the cam follower and said support leg.

8. The bin of claim 4, wherein the cam follower assembly further comprises at least one cam follower roller engages the cam surface throughout the rotation of the stepped cam except when the cam follower engages the cam surface.

9. The bin of claim 8, wherein the cam surface comprises a channel cut into the cam surface allowing the cam follower roller to pass through the channel without engaging the cam surface during the portion of the rotation of the stepped cam in which the cam follower engages the cam surface.

10. A lifting mechanism operably attachable to a support leg of a bin for dispensing particulate material that comprises a plurality of support legs, the lifting mechanism comprising:
- at least one rotationally driven stepped cam having a cam surface, and a cam follower assembly that comprises two cam followers and a cam follower roller provided between the two cam followers, wherein the cam followers support the one of the plurality of support legs and are positioned above the stepped cam and in contact with the cam surface,
- wherein the cam follower roller is lower than or approximately tangential to the bottom surface of the cam followers, whereby the cam follower is in contact with the cam surface throughout at least a portion of the rotation of the stepped cam;
- wherein the cam and the cam follower rollers are in rolling contact, thereby reducing the sliding friction between the cam surface and the cam follower when the stepped cam is rotating.

11. The lifting mechanism of claim 10, wherein the stepped cam comprises:
- a center of rotation; and
- a cam surface that has a continually changing radius as measured from the center of rotation.

12. The lifting mechanism of claim 11, wherein the stepped cam comprises a step in the cam surface where the radius of the cam surface transitions between its maximum radius to its minimum radius and the drive rotates the stepped cam in a direction such that once the cam follower engages the cam surface the radius of the cam surface continually increases thereby pushing the cam follower away from the center of rotation of the cam until said step reaches the cam follower.

13. The lifting mechanism of claim 12, wherein the cam follower engages the cam surface within 5 to 15 degrees of rotation of the stepped cam before said step reaches the cam follower.

14. The lifting mechanism of claim 11 wherein the cam follower roller engages the cam surface throughout the rotation of the stepped cam except when the cam follower engages the cam surface.

15. The lifting mechanism of claim 14, wherein the cam surface comprises a channel cut into the cam surface allowing the cam follower roller to pass through the channel without engaging the cam surface during the portion of the rotation of the stepped cam in which the cam follower engages the cam surface.

\* \* \* \* \*